United States Patent
Yang et al.

(10) Patent No.: US 10,936,227 B2
(45) Date of Patent: Mar. 2, 2021

(54) METHOD, DEVICE, AND COMPUTER PROGRAM PRODUCT FOR RECOGNIZING REDUCIBLE CONTENTS IN DATA TO BE WRITTEN

(71) Applicant: EMC IP Holding Company LLC, Hopkinton, MA (US)

(72) Inventors: Lifeng Yang, Beijing (CN); Xinlei Xu, Beijing (CN); Xiongcheng Li, Beijing (CN); Changyu Feng, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 12 days.

(21) Appl. No.: 16/272,605

(22) Filed: Feb. 11, 2019

(65) Prior Publication Data
US 2019/0332301 A1    Oct. 31, 2019

(30) Foreign Application Priority Data
Apr. 28, 2018 (CN) .......................... 201810401755.0

(51) Int. Cl.
*G06F 3/06* (2006.01)

(52) U.S. Cl.
CPC ............ *G06F 3/0641* (2013.01); *G06F 3/061* (2013.01); *G06F 3/067* (2013.01); *G06F 3/0608* (2013.01); *G06F 3/0661* (2013.01); *G06F 3/0689* (2013.01); *G06F 2207/025* (2013.01); *G06F 2211/007* (2013.01); *G06F 2212/401* (2013.01)

(58) Field of Classification Search
CPC ...... G06F 3/0641; G06F 3/0661; G06F 3/061; G06F 3/067; G06F 3/0608; G06F 3/0689; G06F 2211/007; G06F 2212/401; G06F 2207/025
See application file for complete search history.

(56) References Cited

U.S. PATENT DOCUMENTS

| | | | |
|---|---|---|---|
| 8,694,703 B2 | 4/2014 | Hans et al. | |
| 2007/0233477 A1* | 10/2007 | Halowani | H03M 7/30 704/232 |
| 2008/0071748 A1* | 3/2008 | Wroblewski | G06F 16/2282 |
| 2015/0010143 A1 | 1/2015 | Yang | |
| 2015/0039837 A1* | 2/2015 | Quan | G06F 3/061 711/136 |
| 2017/0017407 A1* | 1/2017 | Wei | G06F 3/0641 |
| 2018/0004659 A1* | 1/2018 | Greenspan | G06F 12/0802 |

* cited by examiner

*Primary Examiner* — Masud K Khan
(74) *Attorney, Agent, or Firm* — BainwoodHuang

(57) ABSTRACT

Techniques recognize reducible contents in data to be written. The techniques involve receiving information related to data to be written, the information indicating that the data to be written comprises reducible contents, the reducible contents comprising data with a first reduction pattern. The techniques further involve recognizing the reducible contents in the data to be written based on the information. The techniques further involve reducing the reducible contents based on the first reduction pattern. With such techniques, active I/O pattern recognition with communication between applications and storage devices may be accomplished. In addition, with such techniques, it is easy/simple to expand recognizable new patterns, and I/O pattern limitations in standard approaches no longer exist.

18 Claims, 8 Drawing Sheets

| BIT BYTE | 7 | 6 | 5 | 4 | 3 | 2 | 1 | 0 |
|---|---|---|---|---|---|---|---|---|
| 0 | OPERATION CODE (9Fh) ||||||||
| 1 | RESERVED |||| SERVICE ACTION (12h) ||||
| 2 | WRPROTECT ||| DPO | FUA | RESERVED || DLD2 |
| 3 | RESERVED ||||||||
| 4 | (MSB) | LOGICAL BLOCK DATA OFFSET |||||||
| 5 | ||||||| (LSB) |
| 6 | Reserved ||||||||
| 7 | |||||||  |
| 8 | (MSB) | NUMBER OF LBA RANGE DESCRIPTORS |||||||
| 9 | ||||||| (LSB) |
| 10 | (MSB) | BUFFER TRANSFER LENGTH |||||||
| ... | |||||||  |
| 13 | ||||||| (LSB) |
| 14 | DLD1 || DLD0 | GROUP NUMBER |||||
| 15 | CONTROL ||||||||

METHOD, DEVICE, AND COMPUTER PROGRAM PRODUCT FOR RECOGNIZING REDUCIBLE CONTENTS IN DATA TO BE WRITTEN

FIELD

Embodiments of the present disclosure generally relate to the field of data storage, and more specifically, to a method, device, and computer program product for recognizing reducible contents in data to be written.

BACKGROUND

When performing input/output (I/O) operations to a disk, a system (e.g., VNX Unity) may implement pattern recognition (can also be referred to as I/O pattern recognition) on data to be written (can also be referred to as I/O data). Specifically, when data to be written get written to provisioned objects, the system may implement Inline Pattern Detection on them to recognize whether they include a pattern in a set of static predefined patterns. For example, when data to be written include data will all 0s or 1s (character string), data in all 0s or 1s patterns (can also be referred to as pattern data) may not be written to the disk. At this point, based on the predefined patterns detected in data to be written, the system may not allocate any space on the disk for these data to be written but only updates metadata for these pattern data.

I/O pattern recognition on I/O data in traditional solutions belongs to passive I/O pattern recognition. Limited kind of I/O patterns can be recognized, i.e. all 0s or 1s patterns. In addition, only 8 bytes repeatable patterns can be supported. Furthermore, pattern model design is quite complicated.

SUMMARY

Embodiments of the present disclosure provide a method, device, and computer program product for recognizing reducible contents in data to be written.

In a first aspect of the present disclosure, provided is a method for recognizing reducible contents in data to be written. The method includes: receiving information related to data to be written, the information indicating that the data to be written includes reducible contents, the reducible contents including data with a first reduction pattern; recognizing the reducible contents in the data to be written based on the information; and reducing the reducible contents based on the first reduction pattern.

In a second aspect of the present disclosure, provided is a device for recognizing reducible contents in data to be written. The device includes: at least one processing unit; and at least one memory coupled to the at least one processing unit and storing instructions to be executed by the at least one processing unit, the instructions, when being executed by the at least one processing unit, causing the device to perform acts including: receiving information related to data to be written, the information indicating that the data to be written includes reducible contents, the reducible contents including data with a first reduction pattern; recognizing the reducible contents in the data to be written based on the information; and reducing the reducible contents based on the first reduction pattern.

In a third aspect of the present disclosure, provided is a computer program product. The computer program product is tangibly stored on a non-transient computer readable medium and includes machine executable instructions which, when being executed, cause the machine to perform any steps of a method according to the first aspect of the present disclosure.

This Summary is provided to introduce a selection of concepts in a simplified form that will be further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features, and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

Figure 1:
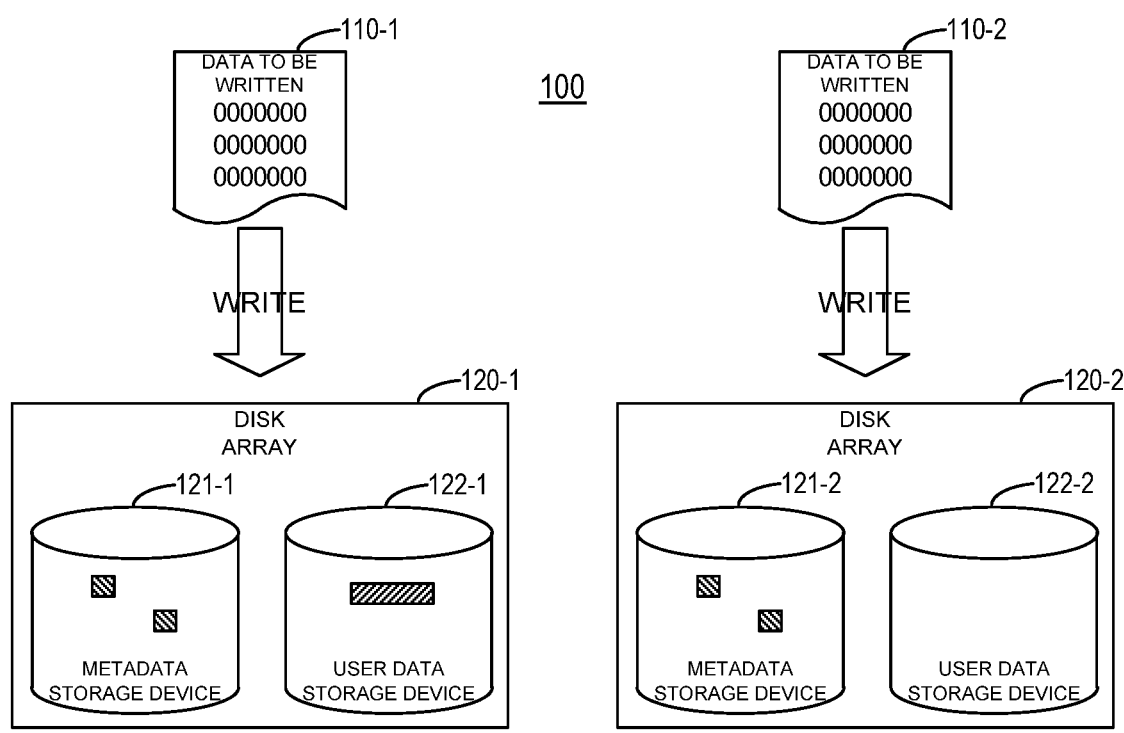
FIG. 1 shows a comparison 100 between data writes without or with pattern recognition.

Some preferable embodiments will be described in more detail with reference to the accompanying drawings. Although the preferable embodiments of the present disclosure have been illustrated, however, it should be understood that the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used herein are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

I/O pattern recognition is of crucial importance in saving disk space for writing data and reducing reads to disks. Table 1 below illustrates the importance of pattern data in reducing I/O data writes by taking I/O data writes to the storage system by the application, Virtual Desktop Infrastructure (VDI), as an example.

TABLE 1

Proportion of Pattern Data in I/O Data Write

| Patterns | Pattern Count | Total Elements | Element Percent | Block Size Percent |
|---|---|---|---|---|
| All patterns | 12,566 | 884,942,459 | 100% | 66.4721% |
| 1. Reducible patterns | 325 | 881,696,712 | 99.6332% | 66.2283% |
| 1.1 All 0 pattern | 1 | 841,261,035 | 95.0639% | 63.1910% |
| 1.2 All 1 pattern | 1 | 1,570,392 | 0.17745% | 0.1180% |
| 1.3 Other Reducible patterns | 323 | 38,865,285 | 4.39184% | 2.9193% |
| 2. Unreducible patterns | 12,241 | 3,245,747 | 0.36677% | 0.2438% |

As recited in Table 1, although reducible patterns take a small proportion of the total pattern count of I/O data writes (325 out of 12,566), its element percent is amazingly high (99.6332%), among which the element percent for all 0 pattern and all 1 pattern is 95.0639%+0.17745%=95.24135%. Therefore, it will be quite advantageous to reduce and simply these reducible patterns of I/O data writes. At the same time, it should be understood that although other reducible patterns take a small element percent (4.39184%) in the example shown in Table 1, they might take a large element percent in other examples.

Pattern recognition in the traditional solution can only recognize an 8-byte all 0s pattern and all 1s patterns in 8 KB data every time I/O data are written to the storage system. Table 2 below records corresponding byte patterns and pattern numbers.

TABLE 2

Byte Pattern and Pattern Number in Pattern Recognition

| Byte Pattern | Pattern Number |
|---|---|
| 0x00 | 0 |
| 0xFF | 1 |

FIG. 1 shows a comparison 100 between data writes without or with pattern recognition. As depicted, the left of FIG. 1 is a scenario of data writes without pattern recognition, and the right of FIG. 1 is a scenario of data writes with pattern recognition. As shown in the left of FIG. 1, in the scenario of data writes without pattern recognition, when all 0 data to be written 110-1 are written to a disk array 120-1, a storage space needs to be allocated on a user data storage device 122-1 to write these all 0 data, and metadata associated with written user data need to be stored in a metadata storage device 121-1.

In comparison, as shown in the right of FIG. 1, in the scenario of data writes with pattern recognition, when all 0 data to be written 110-2 are written to a disk array 120-2, only description (e.g., 0 stored at some addresses) of these all 0 data to be written 110-2 needs to be stored in a metadata storage device 121-2, without a storage space being actually allocated on a user data storage device 122-2 to write these all 0 data.

Therefore, in the scenario of data writes with pattern recognition, the use of a storage space on the user data storage device 122-2 can be reduced, and even no read and write need to be performed to the user data storage device 122-2.

Specifically, in the scenario of data writes with pattern recognition, all 0 written data are taken as an example. When all 0 data to be written reach the storage system, a pattern recognition engine will sample 8 bytes of data at different offsets in every 8 KB data. If the sampling fails, then data to be written are treated normally without pattern recognition. If the sampling succeeds, then it is compared whether sampled data match a pattern (i.e. all 0 pattern or all 1 pattern) in a set of predefined patterns (e.g., hash list). If sampled data are not all 0 pattern or all 1 pattern, then data to be written are treated normally without pattern recognition. If sampled data match all 0 pattern or all 1 pattern, then whole 8 KB data are compared with a pattern in the set of predefined patterns according to a different sample; if whole 8 KB data do not satisfy a pattern in the set of predefined patterns, then data to be written are treated normally without pattern recognition. If whole 8 KB data satisfy all 0 pattern or all 1 pattern, then the block device file system will reduce (e.g., translate) these data to be written, which act as pattern data, to special metadata and store these metadata in the metadata storage device (or update metadata in the metadata storage device) other than storing these pattern data in the user data storage device. Later, when these pattern data are read, they may be restored by reading the metadata. These operations belong to contents in Inline Pattern Detection.

In current design, pattern recognition is enabled or disabled together with data compression, and a sampling and comparison process is very important. Since this process is passive, lots of CPU computing capabilities are consumed, and an adverse impact might be exerted on the overall performance of the storage system. In the meantime, since the pattern recognition is some kind of static deduplication, the original "compression" term in the management interface will be changed to "data reduction." In other words, if consecutive I/O data with the same pattern come from application servers, they are easy to be de-duplicated for compressor service to save the storage capacity. Therefore, using pattern recognition may increase the compression ratio and improve the data write performance.

As described in the BACKGROUND, however, the traditional solution has many drawbacks. Specifically, for some storage devices (e.g., VNX storage devices), CBFS (Common Block File System) is the core component which contains the logic to detect the I/O patterns. Since CBFS itself contains an inside buffer cache, I/O data may reside in the buffer cache for a while for more file system operations, at which point Inline Pattern Detection (ILPD) may be performed to I/O data. However, current Inline Pattern Detection is a passive I/O pattern recognition method, i.e. only when an application sends a data write request to the disk and transmits I/O data, current ILPD is enabled and only passively performs I/O pattern recognition to I/O data. At the same time, current ILPD only can recognize pre-defined patterns, and these predefined patterns can hardly be expanded, because pattern definition is hardcoded in source code. Specifically, current ILPD only can support limited kinds of I/O patterns, i.e. all 0 patterns and all 1 patterns, and only supports 8-byte repeatable patterns. Moreover, the current pattern model design is quite complicated.

To at least partially overcome the above problems in the traditional solution, embodiments of the present disclosure provide a novel pattern recognition solution. The solution is an active I/O pattern recognition solution with the communication between applications and storage devices. The application performs a part of pattern recognition operation to data to be written sent by the application itself, so that a part of pattern recognition is offloaded to the application side to reduce the workload at the storage system side, as the application knows exactly what I/O operation is desired to be performed and contents of data to be written sent by itself. In addition, the solution can easily expand recognizable new patterns and is not subjected to I/O pattern limitation such as pattern data size of 8 KB and 8 bytes.

The pattern recognition solution provided in embodiments of the present disclosure may be used in virtual machine environments (e.g., VMware virtual machine environments) and is applicable to VMware Infrastructure VMs, VDI, and other applications that support VMware API (VAPI) without any change to the pattern recognition solution. It should be understood that the pattern recognition solution provided in embodiments of the present disclosure may also be applicable to general applications such as Database, Exchange mail service, and the like.

Figure 2:
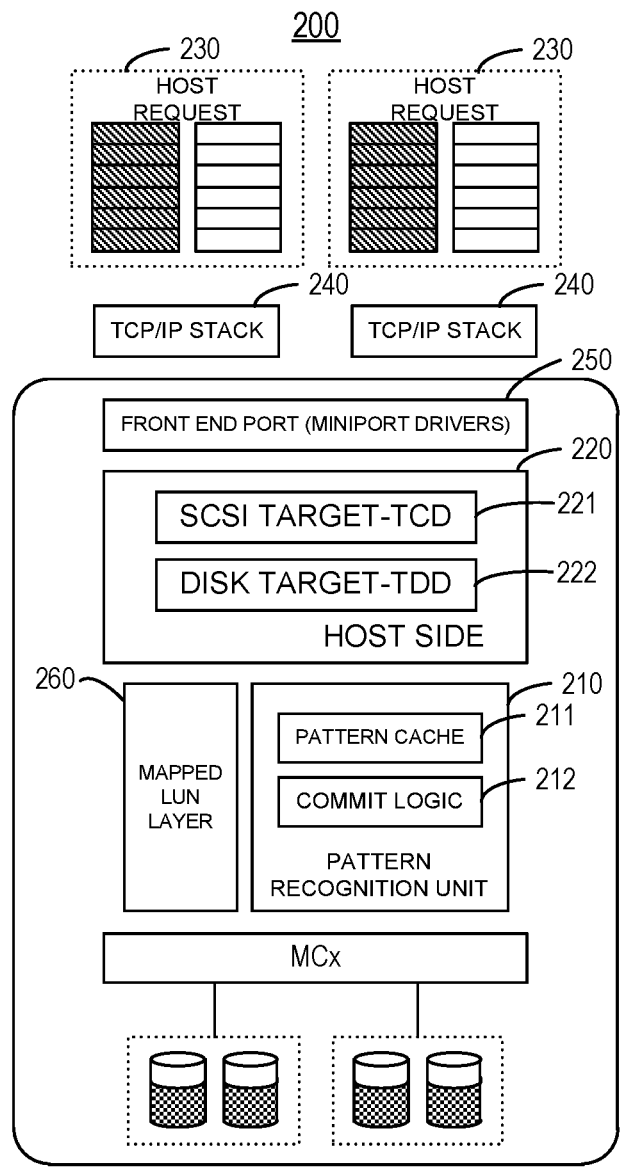
FIG. 2 shows a schematic view of a storage system 200 according to embodiments of the present disclosure.

FIG. 2 shows a schematic view of a storage system 200 according to embodiments of the present disclosure, which storage system 200 may be VNX Unity. As depicted, the storage system 200 includes a pattern recognition unit 210 and a host side 220, the pattern recognition unit 210 including a pattern cache 211 and a commit logic 212. The pattern recognition solution provided in embodiments of the present disclosure is mainly implemented by the pattern recognition unit 210 and the host side 220, wherein the pattern cache 211 may be used for storing a predefined set of reducible patterns (i.e. a set of patterns) and the commit logic 212 may be used for writing reduction pattern data to a storage device of the storage system 200. The arrangement and function of other component in the storage system 200 are similar to corresponding arrangement and function in a traditional storage system.

When the storage system 200 operates, for example, the host side takes the responsibility to process incoming SCSI commands and pack a request 230 into internal IOCTLs. Specifically, the host side may receive a command (the command may include WRITE SAME or other application WRITE SCATTERED commands) from a host application (e.g., VMware, VM, VDI) and pass the request 230 to a lower software layer with a specific flag to notify a lower stack 240 to continue the pattern recognition actions.

The pattern cache 211 processes an incoming I/O request packet (IRP). When the flag along with the WRITE SAME I/O request packet indicates data to be written include multiple duplicates of user data, the pattern cache 211 does not do any sampling and comparison but only looks up in a set of predefined patterns (e.g., in the form of a hash list). If there is a hit (e.g., the pattern that is searched for is found), then written data may be subjected to a further reduction operation; if not, a new pattern may be included to the set of predefined patterns (e.g., by inserting a calculated hash key to the hash list).

Later, the reduced least reserved data (e.g., used data duplicated many times) and the duplicate count will be committed by the commit logic 212 for subsequent processing (e.g., stored or updated to the metadata storage device).

At the same time, since the reduced least reserved data and the duplicate count have been obtained, the subsequent compressor service may receive these data via a fast path of the compressor service and compress data to be written with very high rate.

Based on the above description of the storage system 200 according to embodiments of the present disclosure with reference to FIG. 2, a detailed description is presented below to concrete flows and operations of methods 300, 800 and 900 for recognizing (or identifying) reducible contents in data to be written according to embodiments of the present disclosure with reference to FIGS. 3 to 9. Specifically, FIGS. 3 to 9 are depicted from the perspective of the storage system 200 by referring to the storage system 200 shown in FIG. 2. It should be understood that flows and operations to be described below may further include additional steps and operations that are not shown and/or may omit steps and operations that are shown, and the scope of the present disclosure is not limited in this regard.

Figures 3, 4:
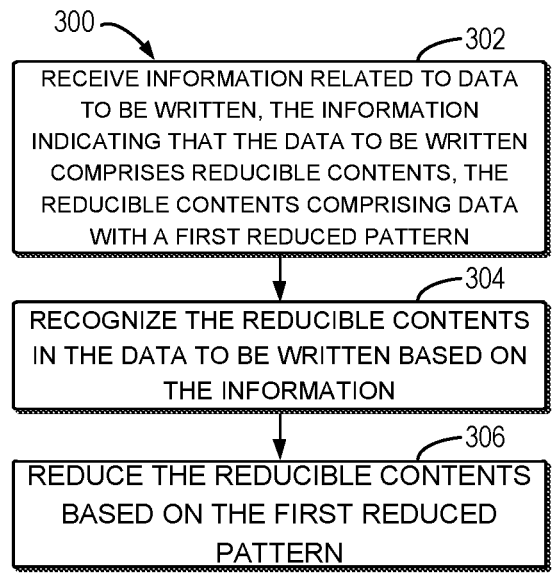
FIG. 3 shows a flowchart of a method 300 for recognizing reducible contents in data to be written according to embodiments of the present disclosure.
FIG. 4 shows a schematic view of a WRITE SAME command 400 according to embodiments of the present disclosure.

FIG. 3 shows a flowchart of a method 300 for recognizing reducible contents in data to be written according to embodiments of the present disclosure. It should be understood that the method 300 may further include an additional step that is not shown and/or may omit a step that is shown, and the scope of the present disclosure is not limited in this regard.

The method 300 starts at block 302 where the storage system 200 receives from an application information related to data to be written. According to embodiments of the present disclosure, the information indicates the data to be written include reducible contents, and the reducible contents include data with a first reduction pattern. According to some embodiments of the present disclosure, the information may also indicate the data to be written do not include any reducible content, at which point the storage system 200 does not need to make sampling and comparison on the data to be written. According to other embodiments of the present disclosure, when the storage system 200 only receives the data to be written without the information, the storage system 200 may consider the data to be written do not include any reducible content, so the storage system 200 does not make sampling and comparison on the data to be written.

In the traditional solution, data are transmitted through a small computer system interface (SCSI) between applications and the storage system 200, so pattern information (information indicating data to be written include reducible contents) cannot be transmitted from an SCSI data path. However, according to embodiments of the present disclosure, a set of APIs (e.g., VMware vSphere Storages APIs-Array Integration (VAAI)) is introduced to extend the SCSI block primitives so as to effect transmission of pattern information. For example, the APIs may define a set of storage primitives that enable ESXi to offload certain storage operations to the array, which reduces resource overhead on the ESXi hosts and can significantly improve performance for storage-intensive operations such as storage cloning, zeroing, and so on.

According to embodiments of the present disclosure, the VAAI block primitives include: Atomic Test & Set (ATS), XCOPY (Extended Copy), and WRITE SAME (ZERO), among which WRITE SAME (ZERO) (can also be referred to as a command) may be used to transmit pattern information.

FIG. 4 shows a schematic view of a WRITE SAME command 400 according to embodiments of the present disclosure.

As shown in FIG. 4, the WRITE SAME command 400 includes a LOGICAL BLOCK ADDRESS field and a NUMBER OF LOGICAL BLOCKS field. One of the most common operations on virtual disks is initializing large extents of the disk with zeroes to isolate virtual machines from remote security. For example, most of VDI datasets contain an all 0s pattern. The WRITE SAME command 400 may be used to zero large portions of a disk. When performing a zeroing operation on the disk with the WRITE SAME command 400, the operation may be effected by a logical block address identified as 0, without data being transmitted over a transmission link.

With the WRITE SAME command 400, the following provisioning tasks may be accelerated:

Cloning operations for eagerzeroedthick target disks.

Allocating new file blocks for thin provisioned virtual disks.

Initializing previous unwritten file blocks for zerothick virtual disks.

A data-out buffer 610 of the WRITE SAME command 400 will contain all 0s. A single zero operation has a default zeroing size of 1 MB. Accordingly, when monitoring VAAI counters, it is possible to observe the WRITE SAME command 400 incrementing in batches of 16 in esxtop. This is because 16 parallel worker threads may be launched for VAAI according to embodiments of the present disclosure. Thereby, a batch increments of 16 WRITE SAME commands 400 may be observed during a zero operation with the WRITE SAME command 400. SCSI Block Command −4 (http://www.t10.org/members/w_sbc4.htm) defines the WRITE SAME command 400, wherein opcode for the WRITE SAME command 400 is 0x93.

During the operation, the WRITE SAME command 400 requests the storage system 200 to transmit a single logical block from the data-out buffer 610 and for each logical block address (LBA) in the specified range of LBAs. The LOGICAL BLOCK ADDRESS field in FIG. 4 is an LBA address and the number is described by a NUMBER OF LOGICAL BLOCKS field in FIG. 4.

Figures 5, 6:
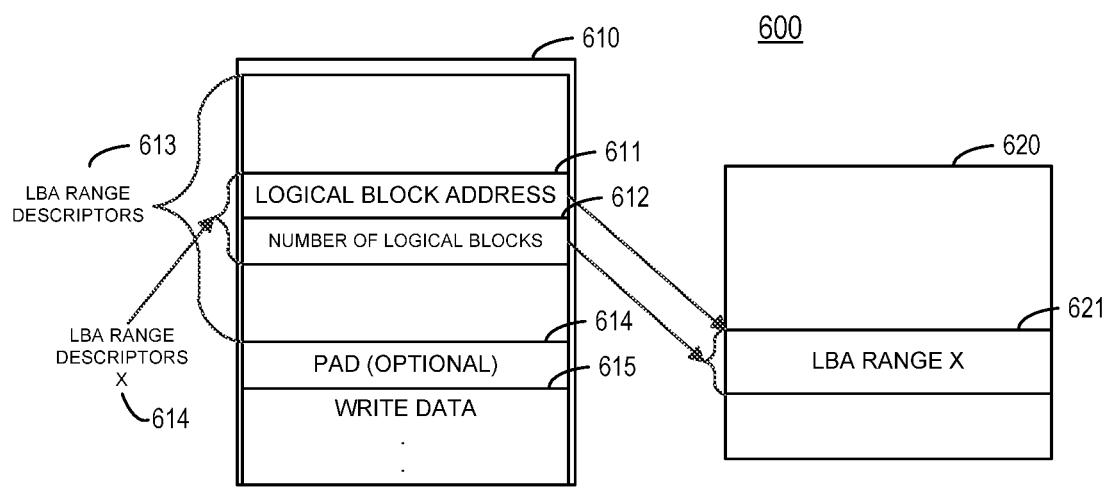
FIG. 5 shows a schematic view of a WRITE SCATTERED command 500 according to embodiments of the present disclosure.
FIG. 6 shows a schematic view of a data write example 600 of a WRITE SCATTERED command 500 according to other embodiments of the present disclosure.

According to embodiments of the present disclosure, pattern information may also be transmitted using a WRITE SCATTERED command. FIG. 5 shows a schematic view of a WRITE SCATTERED command 500 according to embodiments of the present disclosure.

As shown in FIG. 5, the WRITE SCATTERED command 500 includes a LOGICAL BLOCK DATA OFFSET field, a NUMBER OF LOGICAL RANGE DESCRIPTIONS field and a BUFFER TRANSFER LENGTH field. Therefore, the WRITE SCATTERED command 500 may be used to transmit pattern data other than all 0s, all 1s and all other numbers.

FIG. 6 shows a schematic view of a data write example 600 of the WRITE SCATTERED command 500 according to embodiments of the present disclosure, wherein the left is the data-out buffer 610 and the right is logical blocks 620 on the medium. According to embodiments of the present disclosure, the WRITE SCATTERED command 500 describes the ranges of LBAs using a set of LBA range descriptors 613 and 614 in the data-out buffer 610 to describe a logical block address 611 for the first LBA to be written and the number 612 of logical blocks to be written. The WRITE SCATTERED command 500 provides the logical block data to be written for each LBA range in the same data-out buffer 610 as the LBA range descriptors 613. The logical block data for each associated LBA range descriptor 613 are provided in the same order as the LBA range descriptors 613 and follow the LBA range descriptors 613 and optional padding 614.

The LOGICAL BLOCK DATA OFFSET field in the WRITE SCATTERED command 500 specifies the start of the logical block data in the data-out buffer 610. Each LBA range, specified by the LBA range descriptor 613, identifies a set of contiguous LBAs associated with logical block data from the data-out buffer 610.

It should be understood that embodiments of the present disclosure do not limit pattern information is transmitted using the WRITE SAME command 400 and the WRITE SCATTERED command 500, but pattern information may be transmitted in any feasible manner.

In the storage system of FIG. 2, the host side 220 is used to communicate with front-end (dual mode iSCSI and FC) drivers 250. Dual mode refers to the fact that these drivers can initiate I/O and service target I/O to logical units (LUs). The host side 220 component handles the SCSI semantics and will pass read buffer/write buffer SCSI requests to an I/O stack 240 as IOCTLs.

For the front end, the storage system 200 presents a set of ports to allow host access to the storage features of the array. These ports fall into two broad classes, Ethernet and Fiber Channel. Ethernet ports are used for both file and block services, while Fiber Channel ports are used just for block services. Front end ports 250 are provided by subscriber line interface circuits (SLICs) that are inserted into the back of the Service Provider. Device drivers for these ports are provided in two places, i.e. the LINUX kernel for network devices (also using the LINUX TCP/IP stack) and in the user space Data Path Container.

Block services depend partially on the same set of LINUX device drivers and TCP/IP stack 240, but use a different method to move the data from the LINUX kernel into the Data Path Container for processing. This is primarily for iSCSI services. Fiber Channel services represent the other half of the block services world. The user space container SAFE has the Fiber Channel device driver running inside it, using the CSX Helper container in the kernel to bridge the divide between the kernel and user space. Requests from both the iSCSI and Fiber Channel driver enter the TCD/TDD layers (can also be referred to as the host side 220) for SCSI command processing. The host side converts the incoming common data block (CDB) requests into different operations down the data path stack.

The host side 20 has two drivers, a TCD 221 and a TDD 222. In the programming module of the storage system 200, the TCD 221 is in the middle of a miniport driver and the TDD 222. The TCD 221 provides the function of control/configure the interface to create/change/delete. The second function is to receive the SCSI command from the miniport driver and direct the host SCSI commands to a LUN/volume 260, and the commands will be addressed to existing LUs are sent to the TDD driver 222.

The TDD 222 is responsible for providing the correct semantics for SCSI commands that are addressed to the disk. It translates SCSI to the internal commands of an IRP (I/O request packet) and sends the same to lower layer data stacks 240. IRP definition can be located in https://docs.microsoft.com/en-us/windows-hardware/drvers/gettingstarted/i-o-request-packets.

In the storage system of FIG. 2, for an I/O request interface from the miniport to the host side, the miniport driver received the SCSI command procedure and sets its Common Protocol Driver (CPD) interface. The CPD interface primarily consists of a set of basic I/O requests, and secondarily consists of TCD routines called by the miniports directly and miniport routines called by the TCD directly. According to embodiments of the present disclosure, the new pattern information will be encapsulated into a CPD structure as below:
pragma pack(4)

```
typedef struct COMMAND_WRITE_SAME_PATTERN_TAG
{
    IOCTL_HEADER      ioctl_hdr;
    LOGICAL_ADDRESS   logic_addr;
    LOGICAL_NUMBER    logic_block;
    PATTERN_FLAG      pattern_flag;
} S_ COMMAND_ WRITE_SAME_PATTERN, *
PS_ COMMAND_WRITE_SAME_PATTERN;
``` pragma pack( )

In this data structure, logic_addr and logic_block are the data address and block number of user data respectively, pattern_flag indicates the WRITE SAME or WRITE SCATTERED SCSI commands for the requests. The pattern cache will continue processing according to this flag with different behavior.

After the pattern information is retrieved by the TCD driver 221, each SCSI CDB will be copied into a host side internal structure AcceptCCB with the priority information. AcceptCCB is associated with each arriving SCSI CDB. AcceptCCB remains in existence until the status has been sent to the host, until the request is cleaned up. The structure is as below:

```
struct _ACCEPT_CCB {
    PVOID TcdIrp;         //IRP related with CCB
    COMMAND_PATTERN_TAG CCB_Pattern;    //CCB pattern
related with per-SCSI command
    UCHAR Cdb[16];    // The SCSI command.
    ...
}S_ACCEPT_CCB;
```

After that, the IRP needs be allocated from a pre-allocated pool. The IRP is the best way to transmit the priority information which is better than the IOCTRL interface.

In the storage system of FIG. 2, for an I/O request interface from sostside to diskside, diskside(TDD) represents the layers of the stack beside the host side. For each IRP, the EMCPAL_IRP_STACK_FLAGS macro is defined, and an IRP flags data type is wrapped with method SetFlags ( ) and GetFlags in CacheIrpFlags class. Two pattern flags are defined for IRP flags. The IRP flag is set by the TDD 222 to CCB_Priority in AcceptCCB. The structure is as below:

```
#define SL_K10_PER_SCSI_PATTERN_WRITE_SAME
#define SL_K10_PER_SCSI_PATTERN_WRITE_SCATTERED
```

Then the host side 220 calls IoCallDriver( ) to send an I/O IRP down to the lower disk side driver. After the pre-process at the host side 220, the pattern information is exacted from the SCSI command CDB and encapsulated into IRP inside stacks of the storage system, which stacks will be continued to be processed in underlay stacks.

It should be understood that the above structures are merely examples and do not limit embodiments of the present disclosure. Any structure that can satisfy functional needs described in the present embodiment can be used to implement embodiments of the present disclosure.

Still with reference to FIG. 3, at block 304, the storage system 200 identifies reducible contents in the data to be written based on the information received at block 302. According to embodiments of the present disclosure, the reducible contents refer to pattern data. Therefore, according to some embodiments of the present disclosure, after receiving the information, the storage system 200 samples the data to be written to obtain a data sample and recognizes (or identifies) the reducible contents from the data to be written based on the data sample.

According to some embodiments of the present disclosure, when the information only indicates the data to be written contain reducible contents, the storage system 200 may sample the data to be written according to preset sampling granularity (e.g., 8 bytes, 16 bytes, 32 bytes, etc.). According to other embodiments of the present disclosure, the storage system 200 may have learning and judging capabilities, so that the storage system 200 can recognize (or ascertain) from the data to be written reducible contents with reduction patterns which have not been encountered previously.

According to other embodiments of the present disclosure, the information received at block 302 may further indicate a first reduction pattern of the reducible contents, so that the storage system 200 may perform recognition according to the first reduction pattern when recognizing (or detecting) the reducible contents in the data to be written. The first reduction pattern may, for example, include one or more of a size of duplicated data (e.g., 8 KB, 16 KB, etc.), contents of duplicated data, and a duplicate count.

At block 306, the storage system 200 reduces the reducible contents based on the first reduction pattern. According to embodiments of the present disclosure, the storage system 200 can reduce the reducible contents according to the first reduction pattern after knowing the first reduction pattern of the reducible contents.

According to some embodiments of the present disclosure, this step may further include: the storage system 200 determining the first reduction pattern, the storage system 200 looking up for the first reduction pattern in a set of predetermined reduction patterns, the storage system 200 determining a reduction operation corresponding to the first reduction pattern in response to the first reduction pattern being found in the set of reduction pattern; and the storage system 200 reducing the reducible contents based on the determined reduction operation.

As described above, if the information received at block 302 further indicates a first reduction pattern of the reducible contents, then the storage system 200 may directly extract (determine) the first reduction pattern from the information, and perform recognition according to the determined first reduction pattern when recognizing (or ascertaining) the reducible contents in the data to be written. This differs from the traditional solution. Specifically, in a traditional IPLD solution, CBFS needs to buffer I/O data inside the buffer cache and perform cyclic sampling twice; if two sampling results are completely equal, than CBFS will try performing the next process. However, according to embodiments of the present disclosure, this is not necessary, because the incoming IRP may take the pattern information with an IRP flag, and CBFS will check the flag and perform a corresponding act.

In the above step, the set of reduction patterns may be provided in any data format that may include multiple data items and support a lookup. According to some embodiments of the present disclosure, the set of reduction patterns may include a hash list. Moreover, since the set of reduction patterns according to embodiments of the present disclosure may support as many as one hundred thousand reduction patterns, a two-level and even multi-level hash list may be used for the sake of lookup.

In the storage system of FIG. 2, IRP encapsulated by the host side 220 is a partially opaque structure that represents an I/O request packet and is passed from the host side 220 to the mapped LUN layer 260 and CBFS device stacks. Later, as described above, the set of reduction patterns according to embodiments of the present disclosure may be implemented using a hash list.

Figure 7:
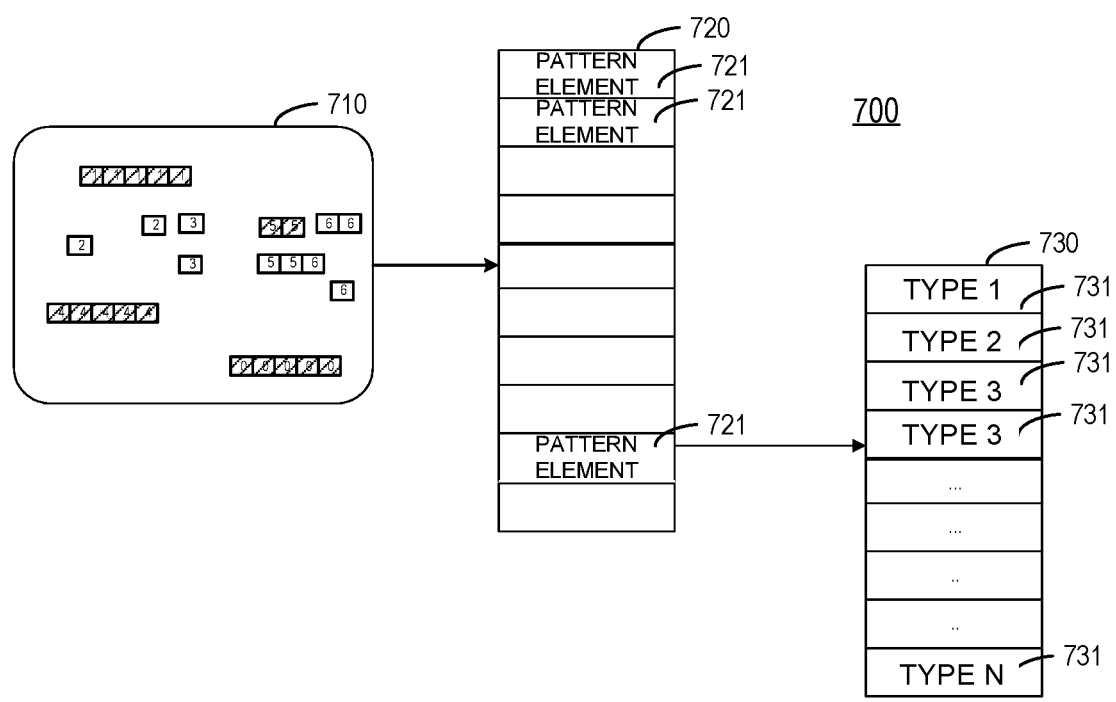
FIG. 7 shows a schematic view of a two-level hash list 700 according to embodiments of the present disclosure.

FIG. 7 shows a schematic view of a two-level hash list 700 according to embodiments of the present disclosure, wherein the left is a data buffer 710, the middle is a pattern hash 720 and the right is a secondary pattern hash 730. According to some embodiments of the present disclosure, after pattern information is exacted from IRP, the data content may be hashed and stored in a pattern hash data structure. As shown in FIG. 7, any pattern needs to search the hash data structure (a set of reduction patterns) to check if it is already in there.

In the storage system of FIG. 2, CBFS implements isPattern( ) which mainly provides an interface from this module. It will check the IRP flag in the package and check if it is WRITE SAME or WRITE SCATTERED (opaque block). If true, this buffer will be treated as a candidate pattern buffer, and a search will be conducted in the pattern hash list to calculate 4 small samples from 4 prime locations as hash keys. If a pattern element 721 has been found, then "optimized memory compared" will be performed for this buffer to guarantee a solid result. Finally, a pattern ID will be returned and a user can get a fixed buffer with a pattern prefilled by this pattern ID.

According to some embodiments of the present disclosure, to support a tremendous number of pattern types by means of a limited hash list size, a two-level hash array data structure may be used. Only a small portion of patterns are fixed in a memory (according to some embodiments of the present disclosure, only all 0 and all 1 patterns are fixed). When other patterns are accessed by read, a new buffer will be generated and returned. The significance of the two-level hash list is that a larger range of pattern elements 721 may be defined at the pattern element level (e.g., a first number of byte cycles, a second number of byte cycles, etc.) and specific types 731 mat be defined at the type level (e.g., contents of cycles). During a hash list lookup (or search), if hit, this means the set of reduction patterns already includes a first reduction pattern that is being looked up currently, at which point the data to be written are reduced according to a reduction operation corresponding to the first reduction pattern.

According to some embodiments of the present disclosure, for all 0s or all 1s patterns, the data to be written do not need to be written actually, but only metadata need to be written or updated for description.

According to some embodiments of the present disclosure, during a hash list lookup, if the hash data structure is not hit, then the new hash key may be inserted into the hash list to extend the hash list. At the same time, a reduction operation corresponding to the new hash key may be determined.

According to some embodiments of the present disclosure, all 0 and all 1 patterns (and other possible all single character patterns, such as all 2, 3, 4, rtc.) may be referred to as single-character repetitive types. Accordingly, other repetitive types (e.g., multi-character cyclic repeat) may be referred to as non-single character repetitive types. At this point, when reducing reducible contents, in response to the first reduction pattern being a non-single character repetitive type, least reserved data (e.g., multiple repetitive characters) and descriptive data (e.g., the location of the multiple repetitive characters and the number of repeats) associated with the least reserved data may be determined from the reducible contents and stored in the storage system 200. According to some embodiments of the present disclosure, the least reserved data may be stored as user data, and the descriptive data may be stored as metadata. When the storage system 200 subsequently receives a read I/O request for the reducible contents, the storage system 200 may restore the reducible contents by reading the least reserved data and the descriptive data, so as to satisfy the read I/O request.

According to some embodiments of the present disclosure, after executing block 306, i.e. after the storage system 200 reduces the reducible contents based on the first reduction pattern, the storage system 200 may store the reduced contents. As described above, when the first reduction pattern is a single character repetitive type, user data may not be actually stored, but only metadata are stored or updated. When the first reduction pattern is a non-single character repetitive type, the reduced contents include the least reserved data and the descriptive data.

The method 300 for recognizing reducible contents in data to be written according to embodiments of the present disclosure has been described in conjunction with the flowchart shown in FIG. 3. By means of the method, an active I/O pattern recognition solution with the communication between an applications and the storage system 200, wherein the application performs a part of pattern recognition operation to data to be written sent by the application itself, so that a part of pattern recognition is offloaded to the application side to reduce the workload of the storage system 200.

According to other embodiments of the present disclosure, the method 300 for recognizing reducible contents in data to be written according to embodiments of the present disclosure may be described as another form in conjunction with FIGS. 2 and 7.

Figure 8:
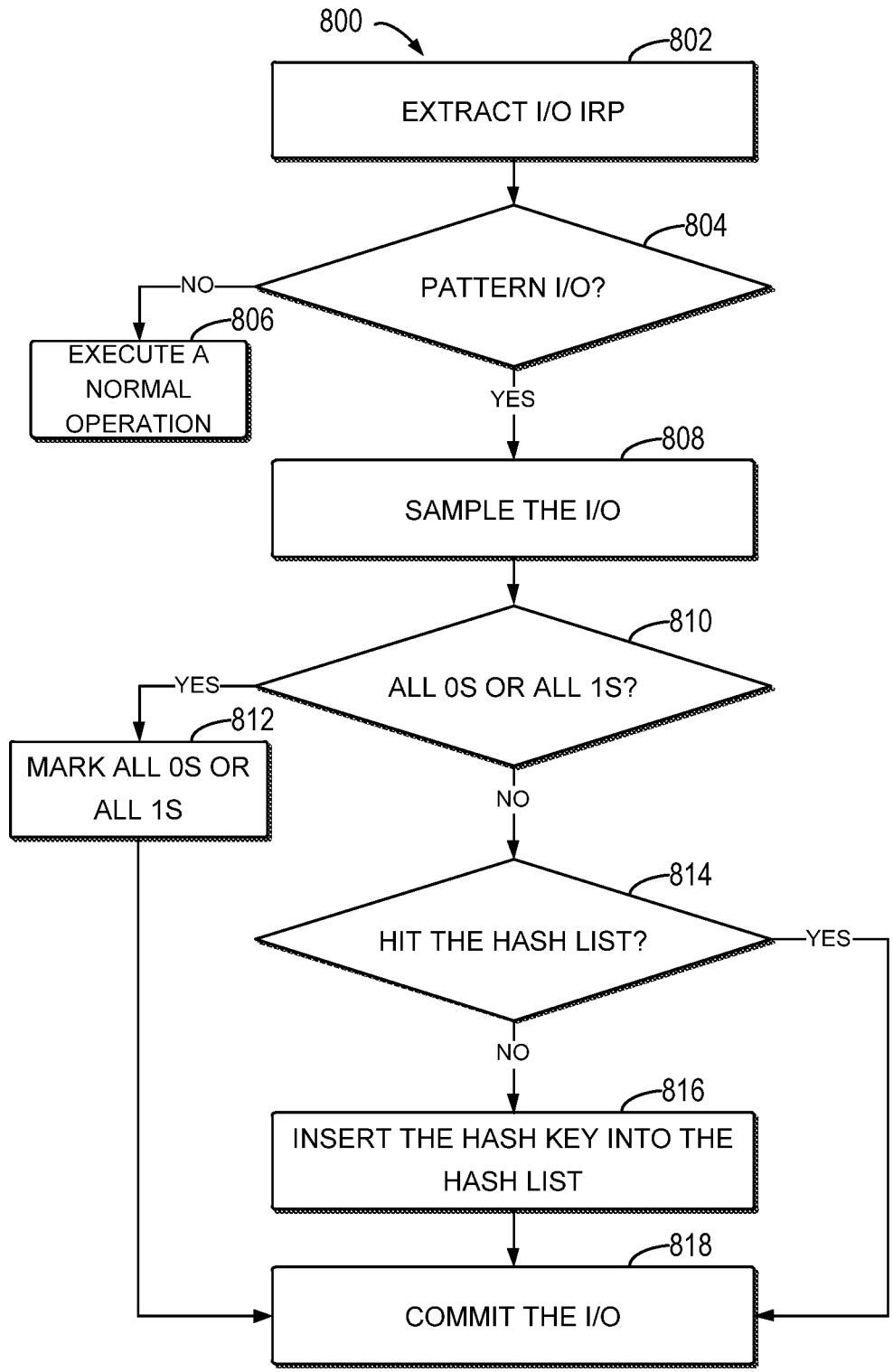
FIG. 8 shows a flowchart of a further method 800 for recognizing reducible contents in data to be written according to embodiments of the present disclosure.

FIG. 8 shows a flowchart of a further method 800 for recognizing reducible contents in data to be written according to embodiments of the present disclosure. It should be understood that the method 800 may further include an additional step that is not shown and/or omit a step that is shown, and the scope of the present disclosure is not limited in this regard.

The method 800 starts at block 802 where the storage system 200 extracts an I/O IRP.

At block 804, the storage system 200 judges whether the I/O is a pattern I/O according to a flag together with the I/O IRP. In response to the I/O not being a pattern I/O, the operation process goes to block 806; otherwise, the operation process goes to block 808.

At block 806, since the I/O is not a pattern I/O and cannot be subjected to a reduction operation, the storage system 200 executes a normal data write operation.

At block 808, since the I/O is a pattern I/O, the storage system 200 samples the I/O.

At block 810, the storage system 200 judges whether a sampling result of the I/O is all 0s or all 1s. In response to the sampling result of the I/O being all 0s or all 1s, the operation process goes to block 812; otherwise, the operation process goes to block 814.

At block 812, since the sampling result of the I/O is all 0s or all 1s, the storage system 200 does not need to perform a lookup (or search) in a hash list, but the operation process directly goes to block 818 where the I/O is committed, i.e. subjected to a reduction and storage operation.

At block 814, since the sampling result of the I/O is not all 0s or all 1s, the storage system 200 performs a lookup (or search) operation in the hash list and judges whether the hash lookup hits the hash list. In response to the hash lookup hitting the hash list, the operation process goes to block 818 where the I/O is committed; otherwise, the operation process goes to block 816.

At block 816, since the hash lookup misses the hash list, the storage system 200 calculates a new hash key for the pattern I/O and inserts the calculated hash key into the hash list. Subsequently, the operation process goes to block 818.

At block 818, no matter whether the operation process goes from block 812, 814 or 816 to block 818, the storage system 200 commits the I/O, i.e. performs a reduction and storage operation.

According to embodiments of the present disclosure, some steps of the method 8—may occur out of the order noted in FIG. 8 but may be executed in the reverse order or concurrently. For example, steps 810 and 814 in the method 800 may be executed in the reverse order or concurrently, without affecting the implementation of the method 800.

According to embodiments of the present disclosure, when the storage system 200 commits the I/O, the commit logic 212 implements two different logics for WRITE SAME and WRITE SCATTERED respectively.

For a WRITE SAME command in the all 0 pattern, if the isPattern( ) is returned to true and data are fixed in the buffer cache, then the compression service will take over the next stage processing in a fast path process logic. The compression service only saves one unique user data and marks the number of blocks as metadata. There is no or very minus CPU effort for this situation. For other WRITE SAME commands, all 1s or repeatable patterns are not limited to 8 bytes but only limited to SBC-4, so innumerable patterns can be supported.

For a WRITE SCATTERED command, WRITE SCATTERED provides logical block data 615 to be written for each LBA range in the same data-out buffer 610 as the LBA range descriptors 613. Same data (sometime with padding) will be written into several LBA ranges 612, and in the viewpoint of the storage system 200, it is also a WRITE SAME command but integrated with multiple writes with a discontinuous LBA range. That range will be treated as the same behavior as WRITE SAME.

According to other embodiments of the present disclosure, the method 300 for recognizing reducible contents in data to be written according to embodiments of the present disclosure may be described as a further form in conjunction with FIGS. 2 and 7.

Figure 9:
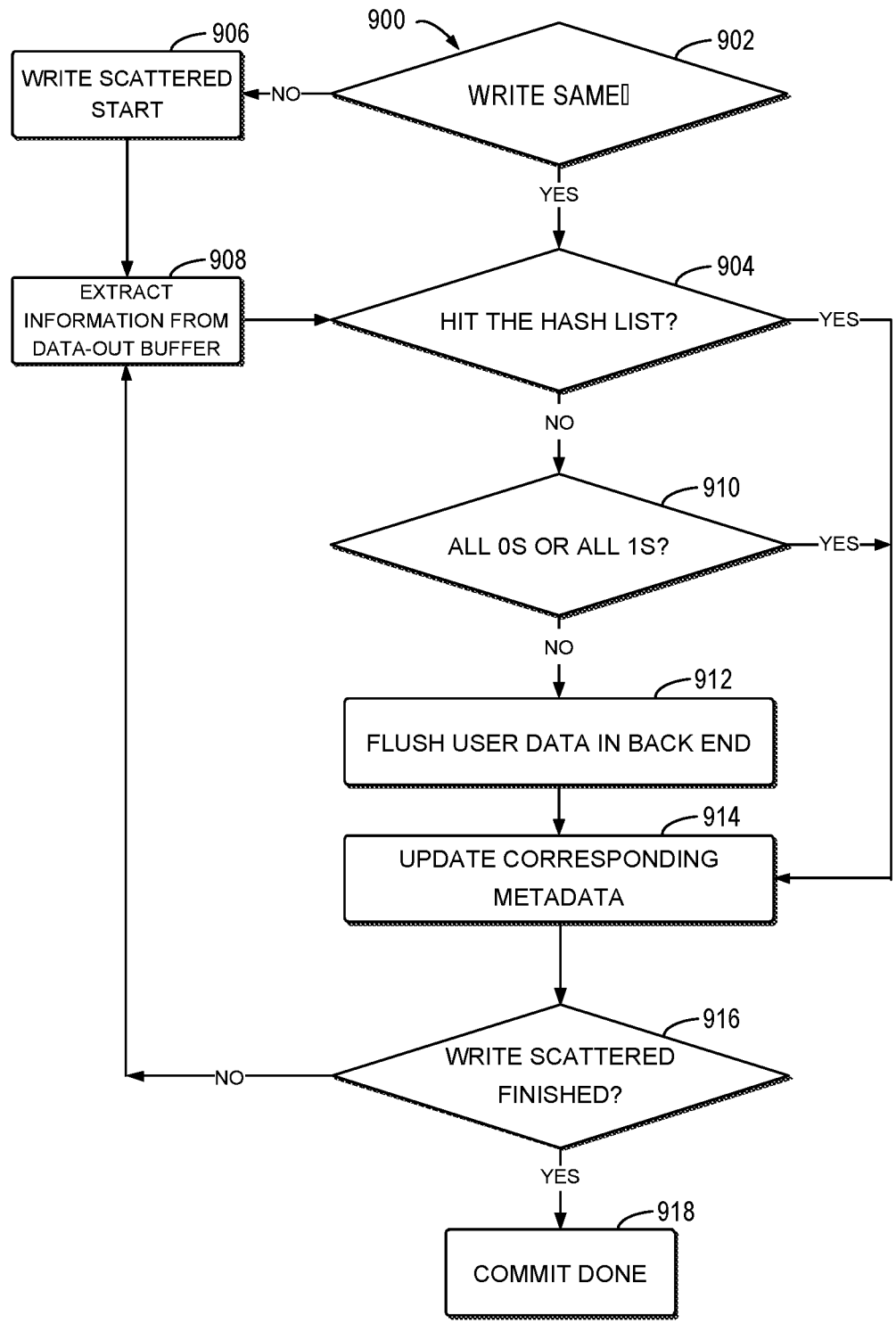
FIG. 9 shows a flowchart of a still further method 900 for recognizing reducible contents in data to be written according to embodiments of the present disclosure.

FIG. 9 shows a flowchart of a still further method 900 for recognizing reducible contents in data to be written according to embodiments of the present disclosure. It should be understood that the method 900 may further include an additional step that is not shown and/or omit a step that is shown, and the scope of the present disclosure is not limited in this regard. According to embodiments of the present disclosure, the method 900 only includes the situation where a I/O write command is WRITE SAME or WRITE SCATTERED.

The method 900 starts at block 902 where the storage system 200 judges whether the I/O write command is WRITE SAME. In response to the I/O write command being WRITE SAME, the operation process goes to block 904; otherwise, the operation process goes to block 906.

At block 904, the storage system 200 performs a lookup in the hash list and judges whether the hash lookup hits the hash list. In response to the hash lookup hitting the hash list, the operation process goes to block 914; otherwise, the operation process goes to block 910.

At block 906, the storage system 200 starts an operation of WRITE SCATTERED, and the operation process goes to block 908. Since the I/O write command is not WRITE SAME, the storage system 200 may determine the I/O write command is WRITE SCATTERED, and thus starts an operation of WRITE SCATTERED.

At block 908, the storage system 200 extracts information from the data-out buffer 610, and the operation process goes to block 904.

At block 910, the storage system 200 judges whether WRITE SAME indicates all 0s or all 1s. In response to WRITE SAME indicating all 0s or all 1s, the operation process goes to block 914; otherwise, the operation process goes to block 912. It can be seen that in the method 900, WRITE SAME indicating all 0s or all 1s is not considered as the hash lookup hitting the hash list, or in other words, the hash list does not store a hash key indicating all 0s or all 1s.

At block 912, the storage system 200 flushes user data contents in back end, i.e. stores user data contents (or reduced data contents), and the operation process goes to block 914.

At block 914, the storage system 200 updates corresponding metadata. As seen from the steps of the method 900, where the I/O write command is WRITE SAME, if the hash lookup hits the hash list or WRITE SAME indicates all 0s or all 1s, user data do not need to be flushed, but only corresponding metadata need to be updated.

At block 916, the storage system 200 judges whether all WRITE SCATTERED commands have been completed. In response to all WRITE SCATTERED commands being completed, the operation process goes to block 918, at which point the commit operation is completed; otherwise, the operation process goes to block 908 where the storage system 200 continues to extract information from the data-out buffer 610. According to some embodiments of the present disclosure, when data in the data buffer 710 include data with various lengths as shown in FIG. 7, then all data in the data buffer 710 might not be committed by completing one WRITE SCATTERED command, at which point multiple cycles need to be performed to commit all data in the data buffer 810.

As seen from the above description with reference to FIGS. 1 to 9, the technical solution according to embodiments of the present disclosure has many advantages over the traditional solution. With the technical solution according to embodiments of the present disclosure, the following problems in the traditional solution can be overcome: I/O pattern recognition of I/O data belongs to passive I/O pattern recognition, only limited kinds of I/O patterns (all 0 and all 1 patterns) can be supported, only 8-byte repeatable patterns can be supported, and pattern model design is quite complicated.

In comparison, the pattern recognition solution provided in embodiments of the present disclosure can achieve active I/O pattern recognition solution with the communication between an application and a storage device, wherein the application performs a part of pattern recognition operation to data to be written sent by the application itself, so that a part of pattern recognition is offloaded to the application side to reduce the workload at the storage system side. In addition, the pattern recognition solution provided in embodiments of the present disclosure can easily expand recognizable new patterns and has no I/O pattern limitation such as pattern data size of 8 KB and 8 bytes.

Figure 10:
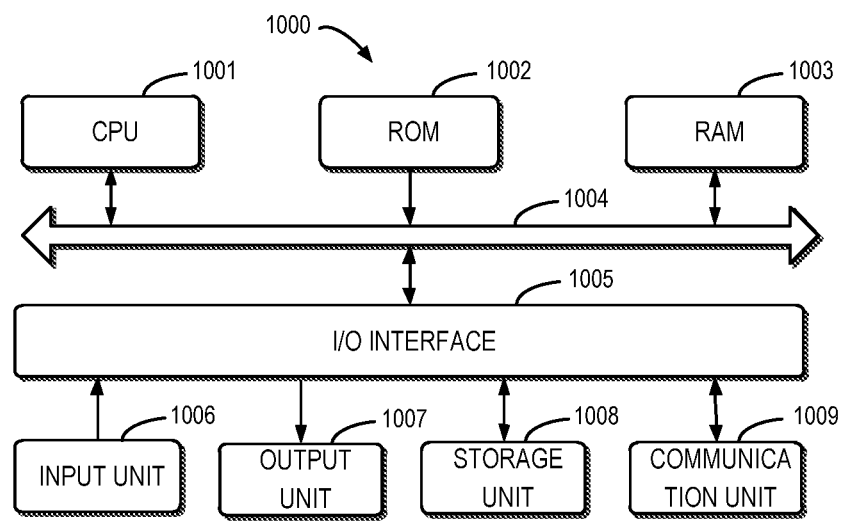
FIG. 10 shows a schematic block diagram of an example device 1000 that is applicable to implement embodiments of the present disclosure.

FIG. 10 shows a schematic block diagram of an example device 1000 suitable for implementing embodiments of the present disclosure. As depicted, the device 1000 includes a central processing unit (CPU) 1001 which is capable of performing various appropriate actions and processes in accordance with computer program instructions stored in a read only memory (ROM) 1002 or computer program instructions loaded from a storage unit 1008 to a random access memory (RAM) 1003. In the RAM 1003, there are also stored various programs and data required by the device 1000 when operating. The CPU 1001, the ROM 1002 and the RAM 1003 are connected to one another via a bus 1004. An input/output (I/O) interface 1005 is also connected to the bus 1004.

Multiple components in the device 1000 are connected to the I/O interface 1005: an input unit 1006 including a keyboard, a mouse, or the like; an output unit 1007, such as various types of displays, a loudspeaker or the like; a storage unit 1008, such as a disk, an optical disk or the like; and a communication unit 1009, such as a LAN card, a modem, a wireless communication transceiver or the like. The communication unit 1009 allows the device 1000 to exchange information/data with other device via a computer network, such as the Internet, and/or various telecommunication networks.

The above-described procedures and processes, such as the methods 300, 800 and 900 may be executed by the processing unit 1001. For example, in some embodiments, the methods 300, 800 and 900 may be implemented as a computer software program, which is tangibly embodied on a machine readable medium, e.g., the storage unit 1008. In some embodiments, part or the entirety of the computer program may be loaded to and/or installed on the device 1000 via the ROM 1002 and/or the communication unit 1009. The computer program, when loaded to the RAM 1003 and executed by the CPU 1001, may execute one or more steps of the methods 300, 800 and 900 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks (e.g., specialized circuitry). These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method for recognizing reducible contents in data to be written, the method comprising:
    receiving a write data command containing information related to data to be written, the information indicating whether the data to be written contains reducible contents, the reducible contents including data with a first reduction pattern;
    based on the information indicating that the data to be written does not contain reducible contents, writing the data to storage without reducing;
    based on the information indicating that the data to written does contain reducible contents, then:
        1) recognizing the reducible contents in the data to be written;
        2) reducing the reducible contents to reduced data based on the first reduction pattern; and
        3) writing the reduced data to storage with an indication that the reduced data requires restoring upon a subsequent read of the data, and
    maintaining a hash list usable to identify sampled data as reducible data,
    wherein recognizing the reducible contents includes sampling the data to be written and determining whether a sampling result indicates that the data to be written has a pattern requiring use of the hash list to identify the data to be written as having the reducible contents, and if so then performing a hash lookup in the hash list to determine (1) in case of a hit, that the reducible contents are known and the write command is then committed, and (2) in case of a miss, calculate a new hash value for the reducible contents and insert the calculated hash value into the hash list for subsequent use,
    and wherein the hash list is a two-level hash list in which (1) a first level is a primary level capturing first information about reducible contents, and (2) a second level is a secondary level referenced by elements of the first level, the second level capturing distinct second information about reducible contents.

2. The method according to claim 1, wherein recognizing the reducible contents in the data to be written comprises:
    sampling the data to be written to obtain a data sample; and
    recognizing the reducible contents from the data to be written based on the data sample.

3. The method according to claim 1, wherein reducing the reducible contents comprises:
    determining the first reduction pattern;
    looking up the first reduction pattern in a predetermined set of reduction patterns;
    in response to the first reduction pattern being found in the set of reduction patterns, determining a reduction operation corresponding to the first reduction pattern; and
    reducing the reducible contents based on the determined reduction operation.

4. The method according to claim 3, further comprising:
    in response to the first reduction pattern not being found in the set of reduction patterns, including the first reduction pattern into the set of reduction patterns.

5. The method according to claim 3, wherein the information related to data to be written indicates a first reduction pattern of the reducible contents, wherein determining the first reduction pattern comprises:
    extracting the first reduction pattern from the information related to data to be written.

6. The method according to claim 1, wherein reducing the reducible contents comprises:
    in response to the first reduction pattern being a non-single character repetitive type, determining from the reducible content least reserved data and description data associated with the least reserved data so as to store the least reserved data and the descriptive data, wherein the least reserved data may be restored to the reducible contents based on the descriptive data.

7. The method according to claim 1, wherein the write data command is contained in an I/O request packet having a flag indicating whether the data to be written contains reducible contents.

8. The method according to claim 7, wherein the flag is an indicator whether the write data command is either a Write Same command or a Write Scattered command, both the Write Same command and the Write Scattered command being used by an application to write data having reducible contents to storage.

9. The method according to claim 1, wherein the first information is cycle information describing a size of a cycle of repetition of data in the reducible contents, and the second information is type information describing data contents of repeated cycles of the reducible contents.

10. A device for recognizing reducible contents in data to be written, comprising:
at least one processing unit; and
at least one memory coupled to the at least one processing unit and storing instructions to be executed by the at least one processing unit, the instructions, when being executed by the at least one processing unit, causing the device to perform acts comprising:
receiving a write data command containing information related to data to be written, the information indicating whether the data to be written contains reducible contents, the reducible contents including data with a first reduction pattern,
based on the information indicating that the data to be written does not contain reducible contents, writing the data to storage without reducing;
based on the information indicating that the data to written does contain reducible contents, then:
1) recognizing the reducible contents in the data to be written,
2) reducing the reducible contents to reduced data based on the first reduction pattern, and
3) writing the reduced data to storage with an indication that the reduced data requires restoring upon a subsequent read of the data, and
maintaining a hash list usable to identify sampled data as reducible data,
wherein recognizing the reducible contents includes sampling the data to be written and determining whether a sampling result indicates that the data to be written has a pattern requiring use of the hash list to identify the data to be written as having the reducible contents, and if so then performing a hash lookup in the hash list to determine (1) in case of a hit, that the reducible contents are known and the write command is then committed, and (2) in case of a miss, calculate a new hash value for the reducible contents and insert the calculated hash value into the hash list for subsequent use,
and wherein the hash list is a two-level hash list in which (1) a first level is a primary level capturing first information about reducible contents, and (2) a second level is a secondary level referenced by elements of the first level, the second level capturing distinct second information about reducible contents.

11. The device according to claim 10, wherein recognizing the reducible contents in the data to be written comprises:
sampling the data to be written to obtain a data sample; and
recognizing the reducible contents from the data to be written based on the data sample.

12. The device according to claim 10, wherein reducing the reducible contents comprises:
determining the first reduction pattern;
looking up the first reduction pattern in a predetermined set of reduction patterns;
in response to the first reduction pattern being found in the set of reduction patterns, determining a reduction operation corresponding to the first reduction pattern; and
reducing the reducible contents based on the determined reduction operation.

13. The device according to claim 12, wherein the acts further comprise:
in response to the first reduction pattern not being found in the set of reduction patterns, including the first reduction pattern into the set of reduction patterns.

14. The device according to claim 12, wherein the information related to data to be written indicates a first reduction pattern of the reducible contents, wherein determining the first reduction pattern comprises:
extracting the first reduction pattern from the information related to data to be written.

15. The device according to claim 10, wherein reducing the reducible contents comprises:
in response to the first reduction pattern being a non-single character repetitive type, determining from the reducible content least reserved data and description data associated with the least reserved data so as to store the least reserved data and the descriptive data, wherein the least reserved data may be restored to the reducible contents based on the descriptive data.

16. The device according to claim 10, wherein the first information is cycle information describing a size of a cycle of repetition of data in the reducible contents, and the second information is type information describing data contents of repeated cycles of the reducible contents.

17. A computer program product having a non-transitory computer readable medium which stores a set of instructions for recognizing reducible contents in data to be written; the set of instructions, when carried out by computerized circuitry, causing the computerized circuitry to perform a method of:
receiving a write data command containing information related to data to be written, the information indicating whether the data to be written contains reducible contents, the reducible contents including data with a first reduction pattern;
based on the information indicating that the data to be written does not contain reducible contents, writing the data to storage without reducing;
based on the information indicating that the data to written does contain reducible contents, then:
1) recognizing the reducible contents in the data ;
2) reducing the reducible contents to reduced data based on the first reduction pattern; and
3) writing the reduced data to storage with an indication that the reduced data requires restoring upon a subsequent read of the data, and
maintaining a hash list usable to identify sampled data as reducible data
wherein recognizing the reducible contents includes sampling the data to be written and determining whether a sampling result indicates that the data to be written has a pattern requiring use of the hash list to identify the data to be written as having the reducible contents, and if so then performing a hash lookup in the hash list to determine (1) in case of a hit, that the reducible contents are known and the write command is then committed, and (2) in case of a miss, calculate a new hash value for the reducible contents and insert the calculated hash value into the hash list for subsequent use,
and wherein the hash list is a two-level hash list in which (1) a first level is a primary level capturing first information about reducible contents, and (2) a second level is a secondary level referenced by elements of the first level, the second level capturing distinct second information about reducible contents.

18. The computer program product according to claim 17, wherein the first information is cycle information describing a size of a cycle of repetition of data in the reducible contents, and the second information is type information describing data contents of repeated cycles of the reducible contents.

\* \* \* \* \*